Feb. 23, 1926.                                                     1,574,489
G. P. KITTEL
MELTING TANK OR KETTLE
Filed May 17, 1924

Inventor
George P. Kittel
By his Attorney

Patented Feb. 23, 1926.

1,574,489

UNITED STATES PATENT OFFICE.

GEORGE P. KITTEL, OF UNION HILL, NEW JERSEY.

MELTING TANK OR KETTLE.

Application filed May 17, 1924. Serial No. 714,143.

*To all whom it may concern:*

Be it known that I, GEORGE P. KITTEL, a citizen of the United States, and a resident of Union Hill, in the county of Hudson and State of New Jersey, have invented certain new and useful Improvements in Melting Tanks or Kettles, of which the following is a specification.

This invention relates to new and useful improvements in melting tanks or kettles for tar, pitch, and articles or materials of an analogous nature.

It is the principal object of my invention to provide a tank, stationary or movable, of this character, in which a uniform melting of the material is effected, and one permitting the use of the molten material while the process of melting is still in progress.

Another object of the invention is the provision of a tank of this type equipped with a screen permitting the flow of the molten material from the melting chamber into the discharge chamber for the molten material and preventing the passage of impurities contained in the raw material from the chamber containing the same into the chamber receiving the molten mass.

A further object of the invention is the provision of a melting tank allowing the uniform and constant heating of the melting and the discharge chambers, and the ready exhaust of the gases of combustion.

A still further object of my invention is the provision of a melting tank or kettle having spaced double walls and equipped with an exchangeable screen in approximately the middle of the inner container dividing the same into two communicating chambers or compartments, one for the reception of the raw material, and the other for the reception of the molten mass allowing a ready discharge therefrom.

These and other objects and advantages of my invention will become more fully apparent as the description thereof proceeds, and will then be specifically pointed out in the appended claims.

In the accompanying drawing, forming a material part of this disclosure:

Figure 1:
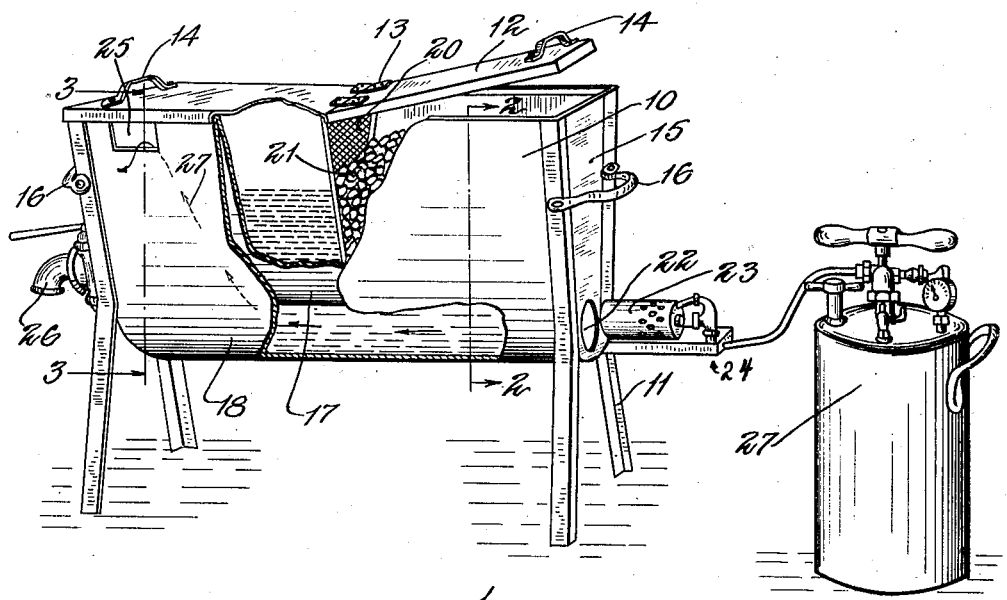
Figure 1 is a perspective view of my improved melting kettle or tank constructed according to the present invention, parts being broken away to more clearly illustrate the interior arrangement.
Figure 2:
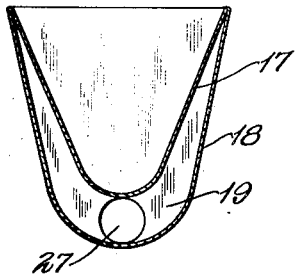
Figure 2 is a cross-section on line 2—2 of Figure 1.
Figure 3:
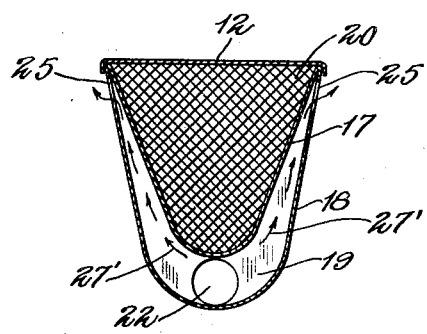
Figure 3 is a cross-section on line 3—3 of Figure 1.

The kettle, tank or container 10 made of any suitable material and convenient dimensions, is supported by a plurality of legs 11, and has a divided cover 12, the parts of which are hingedly connected at their meeting inner edges as at 13, and equipped with handles 14 or the like near their outer ends. The end walls 15 of the tank have handles 16 attached thereto. The tank 10 is double-walled, as indicated at 17 and 18, and between the two walls a chamber or space 19 is formed constituting a fire-box or flue.

A screen 20 of any desired width of mesh divides the tank into two adjoining endwise disposed chambers, one for the reception of the raw material to be melted, as for instance comminuted tar 21. The other chamber receives the molten material flowing through the screen into the same as readily seen in Figure 1. The screen may be stationary or exchangeable.

One of the end walls of the tank has an opening 22 for the introduction of a source of heat for instance as shown, the burner 23 of an oil burning appliance 24 of any well known construction not forming a part of the present invention.

The outer wall 18 of the tank has a trough-like shape and is provided near one of its ends, where the chamber for the molten material is located, near its upper edge, with openings 25 on both sides of the tank, while a drain cock 26 or the like of any well known construction is adapted to be attached to or introduced through an opening in the end wall 15 oppositely disposed to the burner receiving opening 22.

As stated above, the screen can be stationary of a predetermined width of mesh, or may be conveniently shaped and exchangeable to allow a ready flow of the molten material through its meshes while preventing impurities contained in the raw material to pass into the molten mass.

In operation, the burner 23 is introduced through the opening 22 in one of the end walls 15 into the space between walls 17 and 18 directly under the bottom of the chamber containing the raw material, for instance tar. The molten part of the tar will then readily flow through the screen 20 into the adjoining chamber for the reception of the molten material from which it can readily be withdrawn and used through drain cock 26.

The hot gases of combustion will travel through the entire space between the walls 17 and 18 and escape finally through the flue openings 25. It will be clear that in this manner, by the hot gases following the path indicated by arrows 27', the tank will be uniformly and constantly heated so that the molten material may be used from the very start of the melting process, and it will thus not be necessary, as in the known devices of this character to wait until the melting process is entirely finished. This will result in a great saving of time and labor, and the resulting molten mass will be entirely free from impurities and solid pieces liable to ignition, and thus be of an exceptional high grade quality. The tank allows a quick and ready regulation of the heat to any desired degree by the partial or entire removal of the source of heat in order to prevent burning and overflowing of the material.

It will be clear that the cock 26 in the position illustrated in the drawing will be kept constantly heated and thus coagulation of the material and consequent hampering of the work of the cock and total closure by the clogging material will be effectively prevented.

The tank may, if desired be also used with the same good results as a water heater or for any like purposes without departing from the spirit of the present invention.

It will furthermore be understood, that the compartment containing the molten mass is subjected to a more intensive heat than the compartment of the raw material, so that the presence of such raw material or of a fresh supply of such material in the tank will not tend to unduly cool off the tank and consequently no interruption in the use of the molten mass will ever occur or become necessary.

It will be clear that other changes may be made in the general arrangement and in the construction of the minor details of my invention, such as fall within the scope of the appended claims without departure from the spirit of my invention.

Having thus described my invention, what I claim as new, and desire to protect by Letters Patent is:

1. An oil-fired tar kettle comprising a double-walled tank, substantially trough-shaped throughout its length presenting a stream-like flue between its two walls avoiding the formation of dead air spaces, a centrally located strainer within said tank separating the raw material from the molten material allowing a ready flow of the melting material through said strainer and an immediate use of the same during the process of melting by giving to the molten mass the correct temperature and maintaining the same throughout.

2. An oil-fired tar kettle comprising a double walled tank, substantially trough-shaped throughout its length presenting a stream-like flue between its two walls preventing the formation of dead air spaces, a centrally located screen within said tank dividing the same into two endwise adjoining compartments of approximately equal capacity, one for the reception of the raw material and the other for the molten material, said screen allowing a ready flow of the melting material through said strainer at a temperature sufficiently high to allow an immediate use of the material and maintained throughout the operation, one of the end walls of the kettle provided with a circular opening for the ready introduction and withdrawal of an oil burner.

Signed at Union Hill in the county of Hudson and State of New Jersey this sixth day of May A. D. 1924.

GEORGE P. KITTEL.